United States Patent
Taira (10) Patent No.: US 6,490,018 B1
(45) Date of Patent: Dec. 3, 2002

(54) REFLECTIVE LIQUID CRYSTAL DISPLAY DEVICE

(75) Inventor: Yoichi Taira, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 09/664,718

(22) Filed: Sep. 19, 2000

(30) Foreign Application Priority Data

Dec. 17, 1999 (JP) .......................................... 11-359670

(51) Int. Cl.[7] .......................................... G02F 1/1375
(52) U.S. Cl. ...................................................... 349/113
(58) Field of Search ........................................ 349/113

(56) References Cited

U.S. PATENT DOCUMENTS

| | | | | |
|---|---|---|---|---|
| 4,298,249 A | * | 11/1981 | Gloor et al. ................ | 349/113 |
| 5,696,627 A | * | 12/1997 | Benson et al. .............. | 350/338 |
| 6,166,793 A | * | 12/2000 | Hayashi et al. ............. | 349/113 |
| 6,285,426 B1 | * | 9/2001 | Akins et al. ................ | 349/113 |

FOREIGN PATENT DOCUMENTS

| | | |
|---|---|---|
| JP | 08-227071 | 9/1996 |
| JP | 09-311332 | 12/1997 |
| JP | 10-123509 | 5/1998 |
| JP | 11-064831 | 3/1999 |

\* cited by examiner

*Primary Examiner*—James Dudek
(74) *Attorney, Agent, or Firm*—Marian Underweiser, Esq.; McGinn & Gibb, PLLC (57) ABSTRACT

A reflective liquid crystal display device includes a first transparent substrate, a first electrode disposed on one surface of the first transparent substrate, a second transparent substrate having a first surface and a second surface, and a second electrode disposed on the first surface of the second transparent substrate. The first transparent substrate and the second transparent substrate are arranged so that the first electrode and the second electrode face each other and a space is provided between the first electrode and the second electrode. A guest-host liquid crystal layer is disposed in the space, and the first electrode and the second electrode define a plurality of picture element positions. A reflector unit having a shape of a trigonal pyramid is disposed at each of the plurality of picture element positions on the second surface of the second transparent substrate.

25 Claims, 8 Drawing Sheets

REFLECTIVE LIQUID CRYSTAL DISPLAY DEVICE

BACKGROUND OF THE INVENTION

1. Field of the Invention

The present invention relates to a reflective guest-host liquid crystal display (LCD) device having a low cost, simple structure which realizes both high contrast ratio and high reflectivity.

2. Description of the Related Art

An LCD device including a backlight has been widely used as a display device of a desk top personal computer, a portable type personal computer and PDA (Personal Digital Assistants). The latter two portable devices require an LCD device which is thin, light weight and has low power consumption. Therefore, when the LCD device requiring the backlight is used in the portable devices, a power load of the portable equipment is increased.

In place of the LCD device requiring the backlight, a reflective LCD device which uses a guest-host layer and does not require the backlight has been developed as the LCD device of the personal devices. The "guest" means dichroic dye added to the liquid crystal and the "host" means the liquid crystal. The dichroic dye indicates a high absorbance along its longitudinal direction or a long axis. In the guest-host scheme, an alignment direction of the liquid crystal molecules is controlled by an electric field generated by an applied voltage, and the dichroic dyes are simultaneously aligned in the same direction as that of the liquid crystal molecules. If the liquid crystal has a positive anisotropy of dielectric constant, when the electric field is turned off, the guest-host layer sandwiched between two glass substrates is aligned into the homogeneous structure. When the homogeneous structure is illuminated by a visible light, the dichroic dye absorbs a linear polarization component in a plane parallel to its longitudinal direction and passes a linear polarization component in a plane perpendicular to the longitudinal direction. When the electric field is applied, the liquid crystal molecules and the dichroic dyes are aligned in a direction perpendicular to the surface of the glass substrates, and all the incident light passes through the guest-host layer to provide a bright state.

Both high reflectivity at the bright state and high contrast ratio are key factors to the improvement of the reflective guest-host LCD display. Hereinbelow, four types of conventional reflective guest-host LCD devices using the liquid crystal of the positive anisotropy of dielectric constant are described.

In the first-type reflective guest-host LCD device, a single guest-host layer of the homogeneous structure is used. When the voltage applied to the guest-host layer is turned off to provide a dark state, the linear polarization component of the incident light in a plane perpendicular to the longitudinal direction of the dichroic dye passes through the guest-host layer and is reflected toward the guest-host layer by a reflector disposed at the bottom side of the guest-host layer. This reflected linear polarization component passes through the guest-host layer and is observed by a user. Hence, in the dark state, although one linear polarization component of the incident light is suppressed, the other linear polarization component is not suppressed, so that high contrast ratio is not obtained.

In the second-type reflective guest-host LCD device called a "White-Taylor mode device", the liquid crystal molecules and the dichroic dyes are twisted more than 200 degrees between the two glass substrates when the voltage is turned-off, to absorb all the linear polarization components to improve the contrast ratio. However, this type of LCD device does not realize the high reflectivity at the bright state or at the turn on of the voltage. Hence, both the first and second LCD device types cannot simultaneously realize both high contrast ratio and high reflectivity.

In the third-type reflective guest-host LCD device called a "double layer guest-host LCD device", a space between the two glass substrates is separated into an upper compartment and a lower compartment by a transparent separator placed between the two glass substrates. At the turn off of the voltage or the electric field, the guest-host layer of the homogeneous structure in the upper compartment is aligned in one direction, such as a direction parallel to the plane of this page, and the guest-host layer of the homogeneous structure in the lower compartment is aligned in a direction perpendicular to the above one direction, such as a direction passing through the plane of this page. In the dark state, when the electric field is turned off, although the linear polarization component of the incident light in the plane perpendicular to the longitudinal direction of the dichroic dye passes through the guest-host layer in the upper compartment, this passed linear polarization component is suppressed by the guest-host layer in the lower compartment since the plane of the passed linear polarization component matches the plane parallel to the longitudinal axis of the dichroic dyes in the guest-host layer in the lower compartment. Although the third-type LCD device can perfectly block the light at the dark state, a parallax is generated, the structure is complicated, and the fabrication cost is expensive in comparison with the single guest-host layer.

In the fourth-type reflective guest-host LCD device, a reflector, a quarter-wave plate ($\lambda/4$ plate) and an ITO electrode are formed on an inside surface of a lower glass substrate in this order. The ITO is formed on an inside surface of a upper glass substrate. The guest-host layer is sandwiched between the two glass substrates. The linear polarization component of the incident light in the plane perpendicular to the longitudinal direction of the dichroic dye passes through the guest-host layer. During the reflection by the combination of the $\lambda/4$ plate and the reflector, the plane of the passed linear polarization component is rotated by 90 degrees and this 90-degrees-rotated linear polarization component is blocked by the guest-host layer, so that the light is perfectly blocked at the dark state and both high contrast ratio and high reflectivity are realized. However, in this fourth-type device, it is difficult and expensive to design the $\lambda/4$ plate which passes the visible light of a range 450 nm to about 700 nm, and a complicated assembly process is required.

SUMMARY OF THE INVENTION

In view of the foregoing and other problems, disadvantages, and drawbacks of the conventional methods and structures, an object of the present invention is to provide a reflective guest-host LCD device having a low cost, simple structure which realizes both high contrast ratio and high reflectivity.

A reflective liquid crystal display device in accordance with a first aspect of the present invention includes a first transparent substrate, a first electrode disposed on one surface of the first transparent substrate, a second transparent substrate having a first surface and a second surface, and a second electrode disposed on the first surface of the second transparent substrate, wherein the first transparent substrate and the second transparent substrate are so arranged that the first electrode and the second electrode face each other and a space is provided between the first electrode and the second electrode, a guest-host liquid crystal layer is disposed in the space, the first electrode and the second electrode define a plurality of picture element positions, and a reflector unit having a shape of a trigonal pyramid is disposed at each of the plurality of picture element (pixel) positions on the second surface of the second transparent substrate.

The trigonal pyramid preferably includes a bottom plane of a shape of a right-angled isosceles triangle having two shorter edges and one longer edge, a first reflecting plane extending from one of the shorter edges, a second reflecting plane extending from the other of the shorter edges, and a third reflecting plane extending from the longer edge, an angle between the bottom plane and the first reflecting plane is approximately 45 degrees, an angle between the bottom plane and the second reflecting plane is approximately 45 degrees, and an angle between the bottom plane and the third reflecting plane is approximately 87 degrees to about 90 degrees.

Preferably, the second transparent substrate and the reflector units are integrally formed by a transparent material having a refractive index equal to or larger than approximately 1.3.

Preferably, one of the shorter edges of the right-angled isosceles triangle is aligned to a rubbing direction for the guest-host liquid crystal layer. Preferably, a light scattering layer is disposed between the one surface of the first transparent substrate and the first electrode.

Preferably, a color filter layer is disposed between the light scattering layer and the first electrode.

A reflective liquid crystal display device in accordance with a second aspect of the present invention includes a first transparent substrate, a first electrode disposed on one surface of the first transparent substrate, a second transparent substrate having a first surface and a second surface, and a second electrode disposed on the first surface of the second transparent substrate, wherein the first transparent substrate and the second transparent substrate are arranged so that the first electrode and the second electrode face each other and a space is provided between the first electrode and the second electrode, a guest-host liquid crystal layer is disposed in the space, the first electrode and the second electrode define a plurality of picture element positions, and two reflector units each of which has a shape of a trigonal pyramid are disposed at each of the plurality of picture element positions on the second surface of the second transparent substrate.

The trigonal pyramid preferably includes a bottom plane of a shape of a right-angled isosceles triangle having two shorter edges and one longer edge, a first reflecting plane extending from one of the shorter edges, a second reflecting plane extending from the other of the shorter edges, and a third reflecting plane extending from the longer edge, an angle between the bottom plane and the first reflecting plane is approximately 45 degrees, an angle between the bottom plane and the second reflecting plane is preferably about 45 degrees, an angle between the bottom plane and the third reflecting plane is preferably about 87 degrees to about 90 degrees, and the two reflector units at each of the plurality of picture element positions are so disposed that the third reflecting plane of one of the two reflector units is adjacent to the third reflecting plane of the other of the two reflector units.

Preferably, a top point of the one reflector unit and a top point of the other reflector unit are separated by an air gap of about 2 $\mu$m to about 10 $\mu$m. A top point of the one reflector unit and a top point of the other reflector unit are more preferably separated by an air gap of about 5 $\mu$m to about 8 $\mu$m.

A reflector unit array for a reflective guest-host liquid crystal display device in accordance with a third aspect of the present invention includes two reflector units disposed at each of a plurality of picture element positions of the liquid crystal display device for reflecting an incident light into the liquid crystal display device, wherein each of the reflector units has a shape of a trigonal pyramid.

The trigonal pyramid includes a bottom plane of a shape of a right-angled isosceles triangle having two shorter edges and one longer edge, a first reflecting plane extending from one of the shorter edges, a second reflecting plane extending from the other of the shorter edges, and a third reflecting plane extending from the longer edge, an angle between the bottom plane and the first reflecting plane is preferably approximately 45 degrees, an angle between the bottom plane and the second reflecting plane is preferably approximately 45 degrees, an angle between the bottom plane and the third reflecting plane is preferably approximately 87 degrees to about 90 degrees, and the two reflector units at each of the plurality of picture element positions are so disposed that the third reflecting plane of one of the two reflector units is adjacent to the third reflecting plane of the other of the two reflector units.

The present disclosure relates to subject matter contained in Japanese Patent Application No. 11-359670, filed Dec. 17, 1999, which is expressly incorporated herein by reference in its entirety.

BRIEF DESCRIPTION OF THE DRAWINGS

The foregoing and other purposes, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
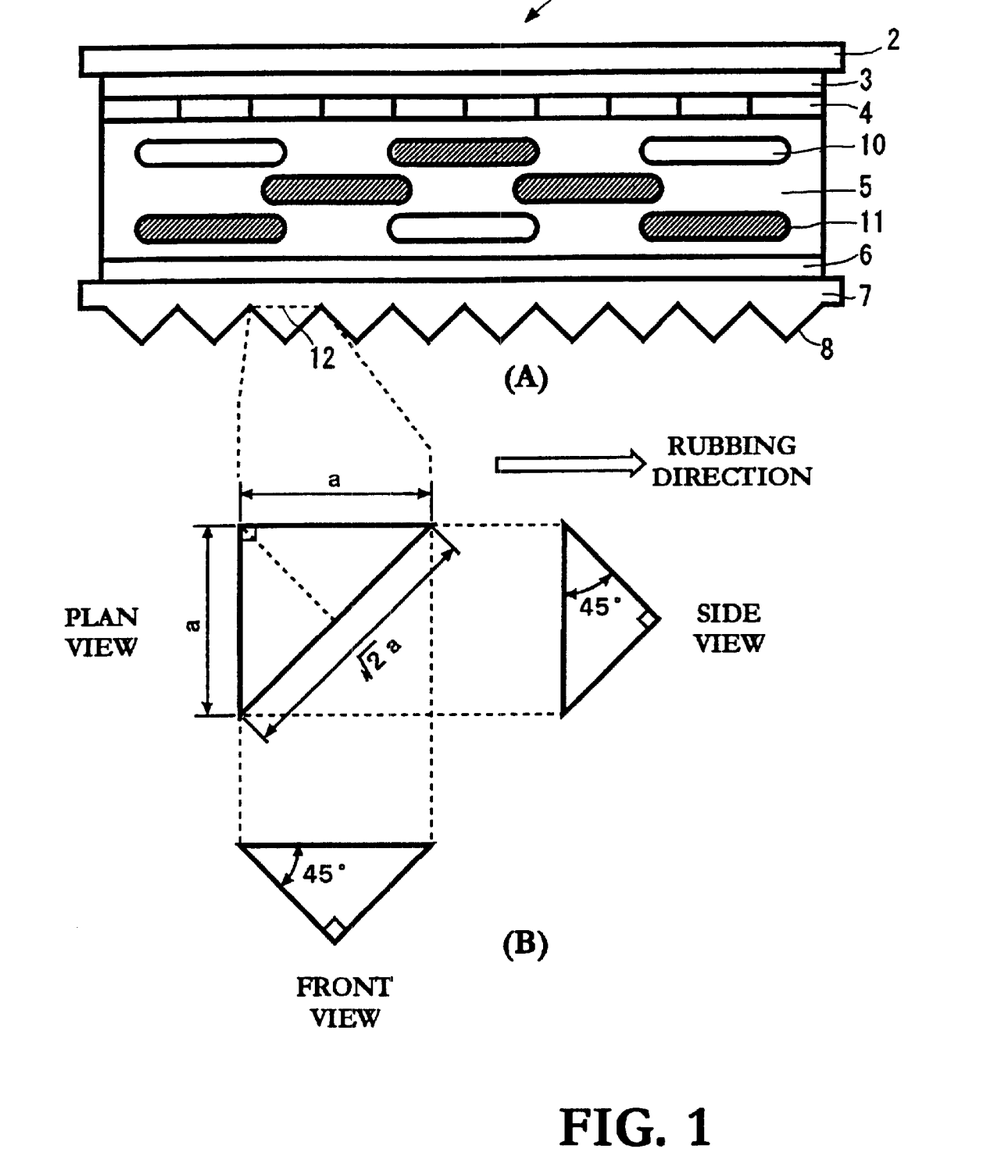
FIGS. 1A and 1B show the basic structure of a reflective guest-host LCD device 1 of a black-and-white-type in the black state in accordance with the present invention.

FIG. 1A shows a basic structure of a reflective guest-host LCD device 1 of a black-and-white-type in the dark state in accordance with the present invention.

The reflective guest-host LCD device 1 includes an upper glass substrate or first transparent substrate 2, a light scattering layer 3, upper electrodes or first electrode 4, such as ITO (Indium Tin Oxide), a guest-host layer 5, a lower common electrode or second electrode 6, such as the ITO, and a lower substrate or second transparent substrate 7. Peripheral edges of the upper glass substrate 2 and peripheral edges of the lower transparent substrate 7 are sealed by a sealing material which is well known in the art. The guest-host layer 5 comprises liquid crystal molecules 10 and dichroic dyes 11 dispersed into the liquid crystal. In the exemplary embodiment, the liquid crystal having a positive anisotropy of dielectric constant is used. Therefore, when the electric field is not applied to provide the dark state, the liquid crystal molecules 10 and the dichroic dyes 11 are aligned in the homogeneous structure as shown in FIG. 1A.

In the exemplary embodiment, the lower substrate 7 and a plurality of reflector units 8 are integrally formed by a transparent material having a refractive index equal to or larger than substantially 1.3. Each of the plurality of reflector units 8 preferably has a shape of a trigonal pyramid. The integral forming of the support substrate 7 and the reflector units 8 allows easy assembly of the plurality of the reflector units 8 on the bottom of the ITO 6. The preferred transparent material of the lower substrate 7 and the reflector units 8 is an acrylic resin, a polystyrene resin, etc. having the above refractive index.

The shape and operation of the reflector units 8 of the trigonal pyramid shape is described by cutting one of the reflector units 8 at a dashed line 12 which is a boundary between the support portion 7 and the reflector unit 8. The shape of the reflector unit 8 is shown in FIG. 1B and FIG. 2.

Figure 3A:
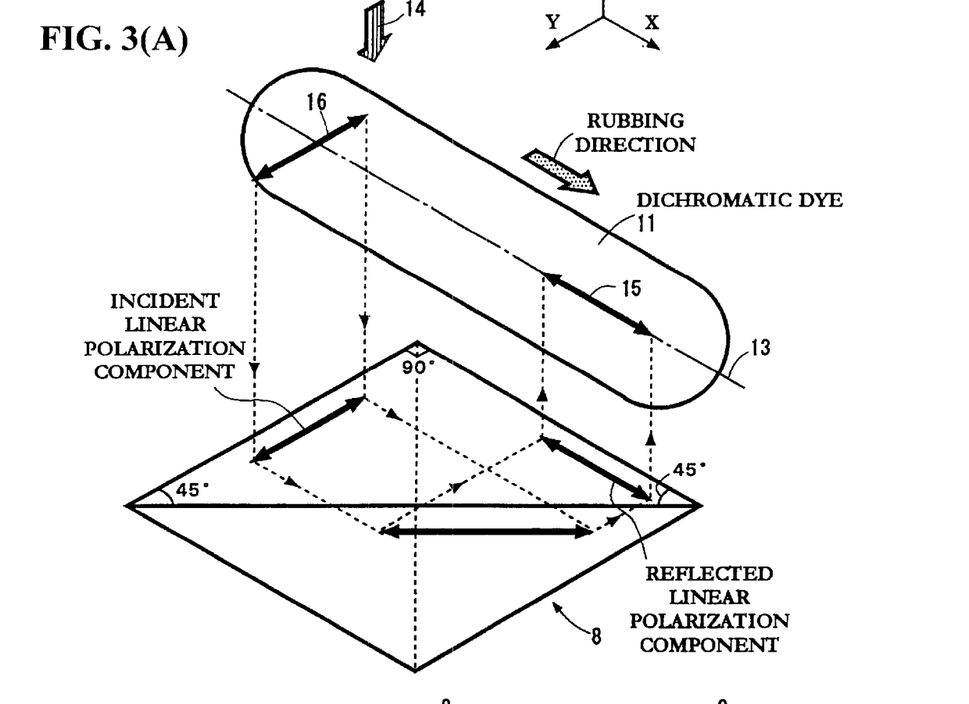
FIGS. 3A–3C show the operation in the dark state of the reflective guest-host LCD device 1 in accordance with the present invention.

FIG. 1B shows a plan view, a front view and a side view of the reflector unit 8. FIG. 1B also shows a rubbing direction on the surfaces of both the ITO layers 4 and 6. More particularly, both the surfaces of the ITO layers 4 and 6 are rubbed in the rubbing direction which is parallel to the shorter edge in the horizontal direction of the right-angled isosceles triangle shown in the plan view in FIG. 1B, whereby the horizontal edge of the right-angled isosceles triangle, which is the bottom of the trigonal pyramid, is aligned to the long axis 13 of the dichroic dye 11, as shown in FIG. 3.

Figure 2:
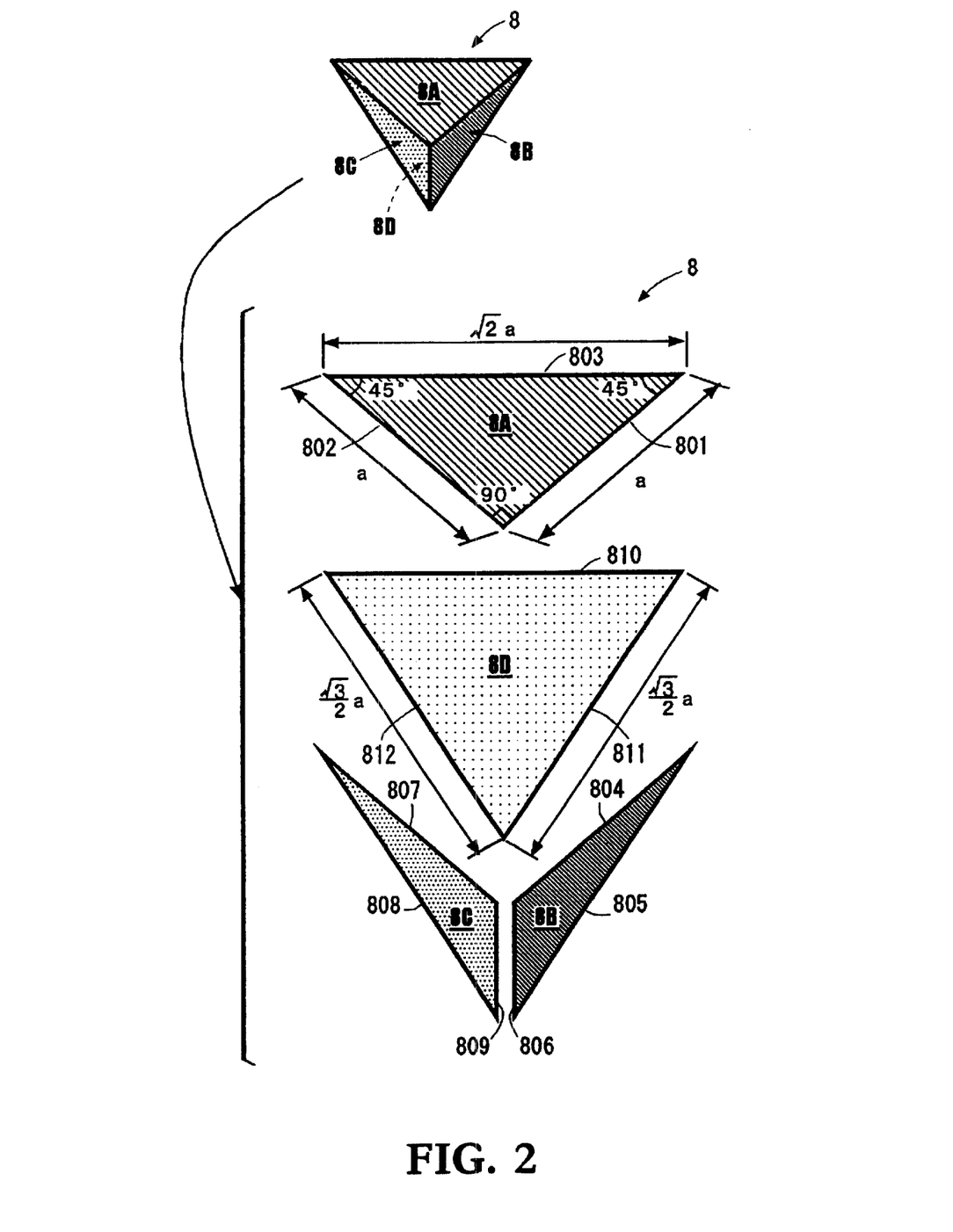
FIG. 2 is an exploded figure showing the planes of a reflector unit of a trigonal pyramid of the device 1 in accordance with the present invention.

FIG. 2 is an exploded figure showing the planes of the reflector unit 8 of the trigonal pyramid when the reflector unit 8 is seen in an oblique direction. The reflector unit 8 of the trigonal pyramid includes (a) a bottom plane 8A which is a plane formed by cutting along the dashed line 12 and is disposed to face against and in parallel with the bottom surface of the ITO 6 and has a shape of a right-angled isosceles triangle, (b) a first reflecting plane 8B extending from one of the shorter edges of the right-angled isosceles, (c) a second reflecting plane 8C extending from the other of the shorter edges, and (d) a third reflecting plane 8D extending from the longer edge.

The bottom plane 8A has two shorter edges 801 and 802 and a hypotenuse edge 803. The length of the edges 801 and 802 is "a", and the length of the hypotenuse 803 is, as follows.

The length of the hypotenuse edge=$\sqrt{2}$ a

An edge 804 of the first reflecting plane 8B is connected to the edge 801, and an edge 807 of the second reflecting plane 8C is connected to the edge 802. An edge 806 of the first reflecting plane 8B is connected to an edge 809 of the second reflecting plane 8C. An edge 810 of the third reflecting plane 8D is connected to the hypotenuse edge 803, an edge 811 is connected to the edge 805, and an edge 812 is connected to the edge 808. The length of the edges 811 and 812 is, as follows.

$$\text{The length of the edge} = \frac{\sqrt{3}\,a}{2}$$

The plan view of FIG. 1B shows the bottom plane 8A, and the front view and the side view show the third reflecting plane 8D. An angle between the bottom plane 8A and the first reflecting plane 8B is preferably approximately 45 degrees, the angle between the bottom plane 8A and the second reflecting plane 8C is preferably approximately 45 degrees, and an angle between the bottom plane 8A and the third reflecting plane 8D can be selected to a range of preferably approximately 87 degrees to about 90 degrees. It has been experimentally confirmed that the range of angle of preferably approximately 87 degrees to about 90 degrees realizes the high contrast ratio and the high reflectivity.

Next, the operation in the dark state of the reflective guest-host LCD device of the present invention is described with reference to FIGS. 1A–1B and 3A–3C. In FIG. 3A, one dichroic dye 11 and one reflector unit 8 of the trigonal pyramid type are shown. A direction Z is perpendicular to the surface of the upper glass layer 2, a direction X indicates the direction of the long axis 13 of the dichroic dye 11 in the homogeneous structure, and a direction Y indicates the direction perpendicular to the long axis 13. The incident visible light 14 illuminates in the direction Z the surface of the glass substrate 2.

In the dark state, the voltage is not applied across the ITO 4 and the common ITO 6, so that the liquid crystal molecules 10 and the dichroic dyes 11 are arranged in the homogeneous structure in which the liquid crystal molecules 10 and the dichroic dyes 11 are aligned in the rubbing direction parallel to the X direction and substantially parallel to the surface of the glass substrate 2, as shown in FIGS. 1A and 1B.

In the homogeneous structure, the guest-host layer operates in an absorbing mode in which the dichroic dye 11 absorbs the linear polarization component 15 in the plane parallel to its long axis 13 and passes the linear polarization component 16 in the plane perpendicular to the long axis 13, as described before. The passed linear polarization component 16 is directed to the first reflecting plane 8B (FIG. 2) of the reflector unit 8 in the direction Z. Since the reflector unit 8 is made of the transparent material having a refractive index equal to or larger than substantially 1.3, and the atmosphere surrounding the reflector unit 8 is an air having the refractive index of substantially 1.0, the light directed into the reflector unit 8 with an incident angle smaller than a critical angle is reflected at the boundary between the transparent material and the air due to a total internal reflection.

Accordingly, the linear polarization component 16 is reflected at the first reflecting plane 8B (FIG. 2) toward the third reflecting plane 8D (FIG. 2) along the direction X. The third reflecting plane 8D reflects the linear polarization component toward the second reflecting plane 8C (FIG. 2) in the direction Y, and the second reflecting plane 8C reflects the linear polarization component toward the dichroic dye 11 in the direction Z. It is noted that the plane of the incident linear polarization component 16 is rotated by 90 degrees during the reflection within the reflector unit 8, and the 90-degrees-rotated linear polarization component 15 is reflected back to the dichroic dye 11. Since the plane of the 90-degrees-reflected linear polarization component 15 matches the plane parallel to the long axis 13 of the dichroic dye 11, the 90-degrees-rotated linear polarization component 15 is blocked by the dichroic dye 11. In this manner, the linear polarization components 16 passed through the dichroic dye 11 are rotated by 90 degrees, and this 90-degrees-rotated linear polarization component is absorbed by the dichroic dye 11 in the absorbing mode, so that no light is observed by the user at the dark state, and thus the contrast ratio is improved.

Figure 3B:
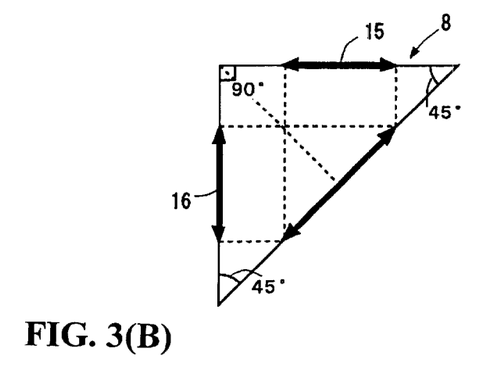
Figure 3C:
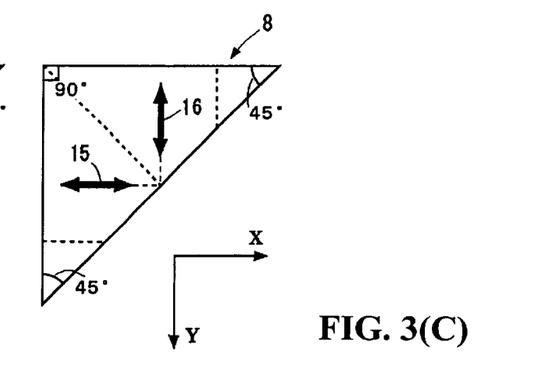

FIG. 3B shows when the linear polarization component 16 is reflected by the first reflecting plane 8B, the third reflecting plane 8D and second reflecting plane 8C in this order. FIG. 3C shows when the linear polarization component 16 is initially directed onto the second reflecting plane 8C. In this case, the linear polarization component 16 is reflected by the second reflecting plane 8C, the third reflecting plane 8D and the first reflecting plane 8B in this order.

Describing the bright state, the voltage is applied across the ITO 4 of the selected PEL(s) and the common ITO 6 to apply the electric field in the Z direction, so that the liquid crystal molecules 10 and the dichroic dyes 11 in the selected PEL(s) are aligned in the direction Z of the electric field to operate in a transmission mode in which all the components in the light are transmitted without being absorbed. Accordingly, all the components of the incident light of the selected PEL(s) are reflected by the three planes 8B, 8D and 8C, and pass through the guest-host layer 5, the ITO 4, the light scattering layer 3 and the upper glass substrate 2, and observed by the user.

Figure 4:
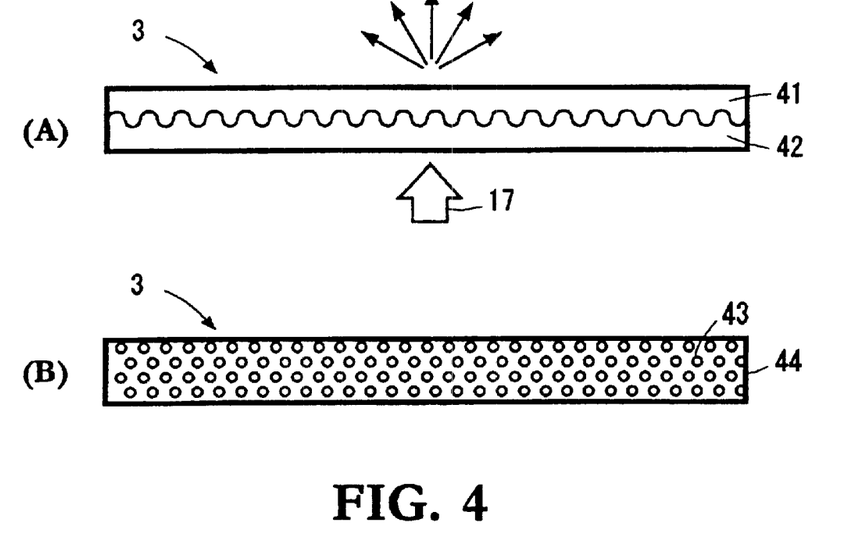
FIGS. 4A and 4B show the structures of a light scattering layer of the device 1.

FIGS. 4A and 4B show the structures of the light scattering layer 3. The light scattering layer 3 is used to scatter the light 17 to various directions, as shown in FIG. 4A, whereby the user can observe the light of the selected PELs from various oblique directions. The light scattering layer 3 shown in FIG. 4A includes a first transparent layer 41 having a refractive index $n_1$ and a second transparent layer 42 having a refractive index $n_2$, which differs from the value $n_1$. A rugged boundary is formed between the first layer 41 and the second layer 42 to provide the light scattering effects. The light scattering layer 3 shown in FIG. 4B includes a plurality of transparent particles 43 having a refractive index $n_3$ distributed in a transparent material 44 having a refractive index $n_4$, which differs from the value $n_3$ to provide the light scattering effects. The preferred material for components 41 through 44 is a transparent plastic.

Figure 5:
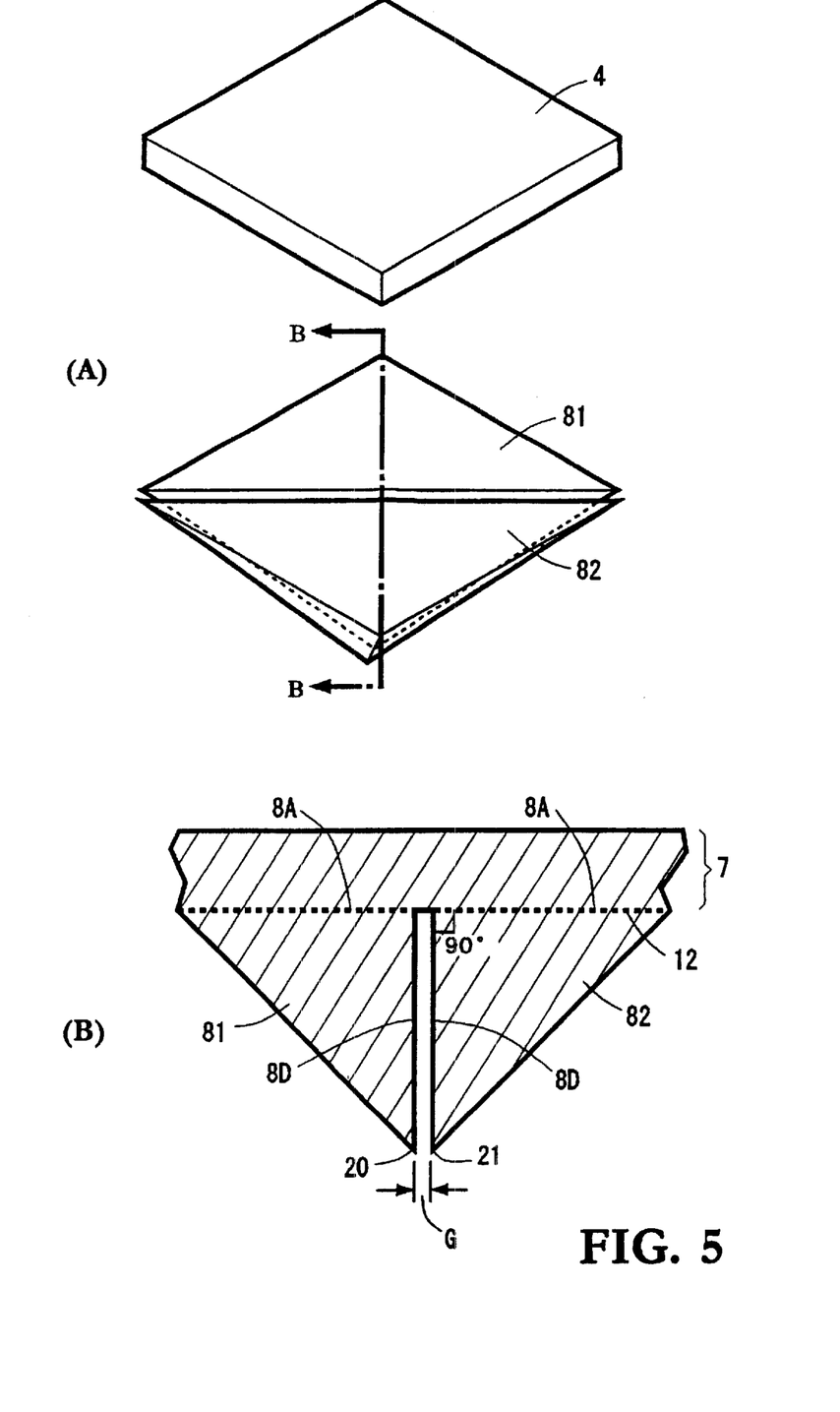
FIGS. 5A and 5B show the ITO and the two reflector units for forming one picture element (PEL)

In general, the shape of one PEL of the LCD device is a square. To realize the square PEL, two reflector units 81 and 82 are so arranged that the third reflecting plane 8D of one reflector unit 81 faces the third reflecting plane 8D of the other reflector unit 82, as shown in FIG. 5A. In FIG. 5A, the ITO 4 and the two reflector units 81 and 82 are shown for forming one PEL. In this case, the angle between the bottom plane 8A (FIG. 2) and the third reflecting plane 8D (FIG. 2) of each reflector unit is substantially 90 degrees. In FIG. 5A, the upper glass substrate 2, the light scattering layer 3, the guest-host layer 5 and the common ITO 6 shown in FIG. 1A are not shown for simplicity. The structure of each of the two reflector units 81 and 82 is the same as that described with reference to FIGS. 1B, 2 and 3A–3C. A cross-section of the two reflector units 81 and 82 along a line B-B is shown in FIG. 5B.

As shown in FIG. 5B, the two reflector units 81 and 82 and the supporting substrate 7 are integrally formed for easy assembly of the plurality of the reflector units 8 on the bottom of the ITO 6, as described before. Only two reflector units 81 and 82 cut along the dashed line 12 (FIG. 1A) are shown in FIG. 5A for simplifying the drawing. A top point 20 of the trigonal pyramid reflector unit 81 and a top point 21 of the trigonal pyramid reflector unit 82 are separated by an air gap G. It is experimentally confirmed that the value of the air gap G should be in the range of preferably approximately 2 $\mu$m to about 10 $\mu$m, and more preferably in the range of about 5 $\mu$m to about 8 $\mu$m, to realize the desired high contrast ratio and high reflectivity.

The ITO 4 shown in FIG. 5A is a discrete electrode provided for each PEL in the TFT drive scheme. Since the drive scheme of the ITO by the TFT is well known in the art, this is not described. A simple matrix scheme also can be used for selectively driving the electrode of the selected PEL(s).

Figure 6:
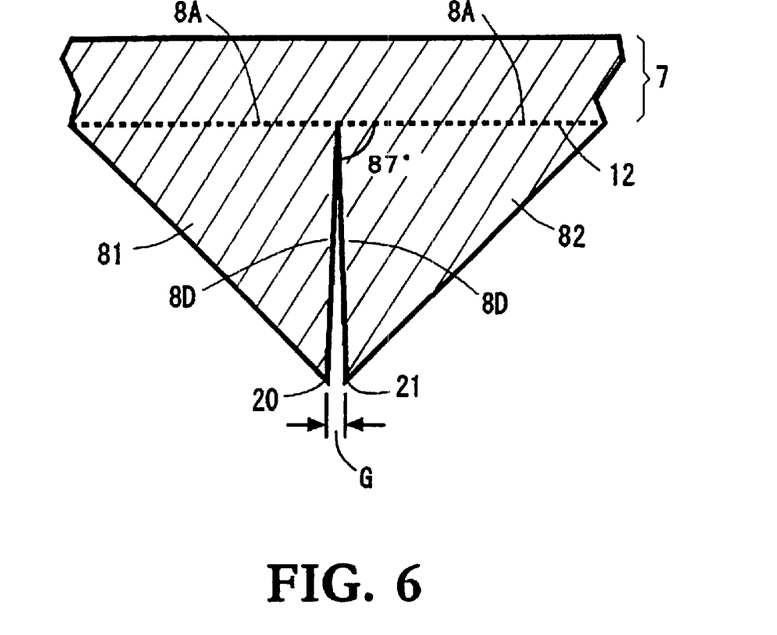
FIG. 6 is a cross-section of another embodiment of the reflector units.

FIGS. 6A and 6B show the cross-section of the two reflector units 81 and 82 forming one PEL. In this case, the angle between the bottom plane 8A (FIG. 2) and the third reflecting plane 8D (FIG. 2) of each reflector unit is the angle 87 degrees. The top point 20 of the trigonal pyramid reflector unit 81 and the top point 21 of the trigonal pyramid reflector unit 82 are also separated by an air gap G. In this case, the value of the air gap G should be also in the range of about 2 $\mu$m to about 10 $\mu$m, and more preferably in the range of about 5 $\mu$m to about 8 $\mu$m to realize the desired high contrast ratio and high reflectivity.

Figure 7:
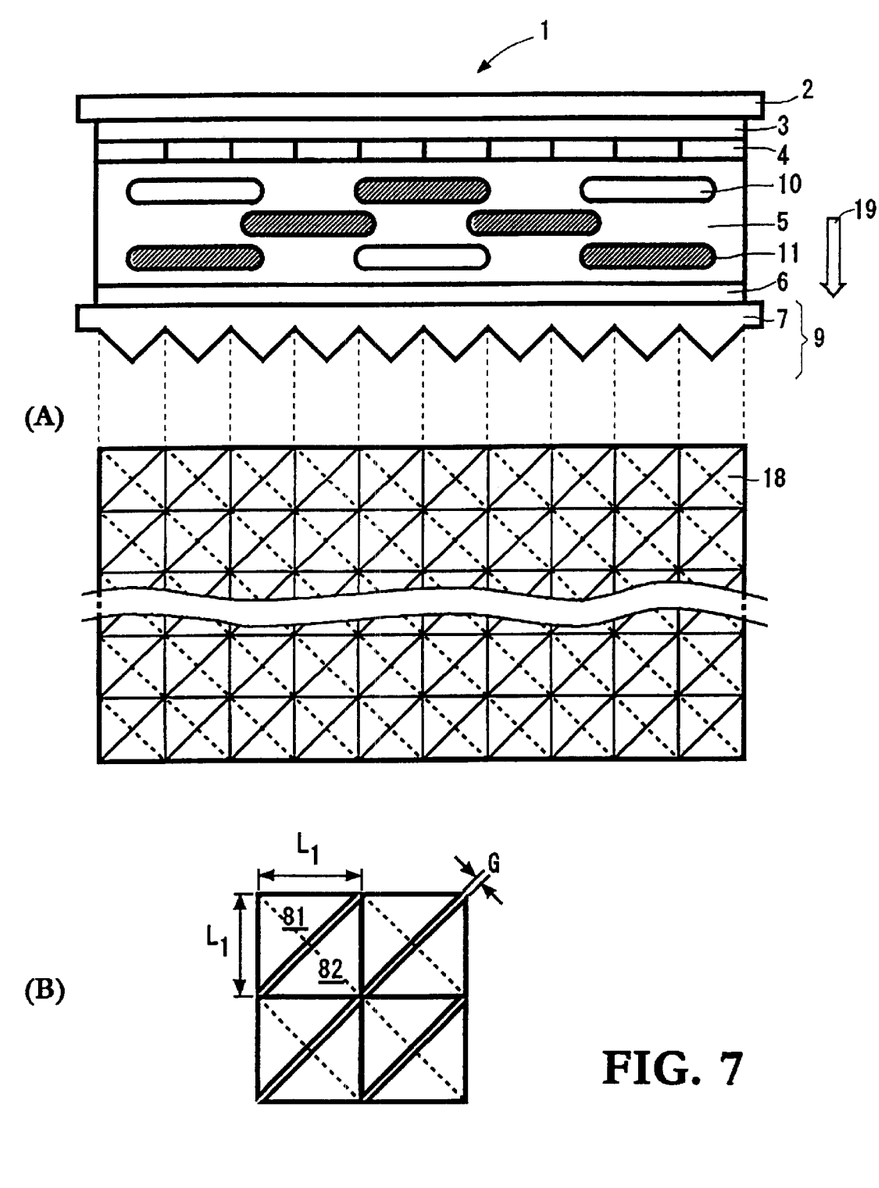
FIGS. 7A and 7B show, respectively, the black-and-white-type reflective guest-host LCD device 1 and a plan view of a reflector unit array in accordance with the present invention.

FIG. 7A shows the black-and-white-type reflective guest-host LCD device 1 shown in FIG. 1A and a plan view of a reflector unit array 18 viewing in a direction of an arrow 19. FIG. 7B shows a plan view of reflector units for the four PELs, each of which includes the two reflector units 81 and 82. One PEL has a horizontal length $L_1$ and a vertical length $L_1$. An exemplary value of the lengths $L_1$ is 100 $\mu$m.

Figure 8:
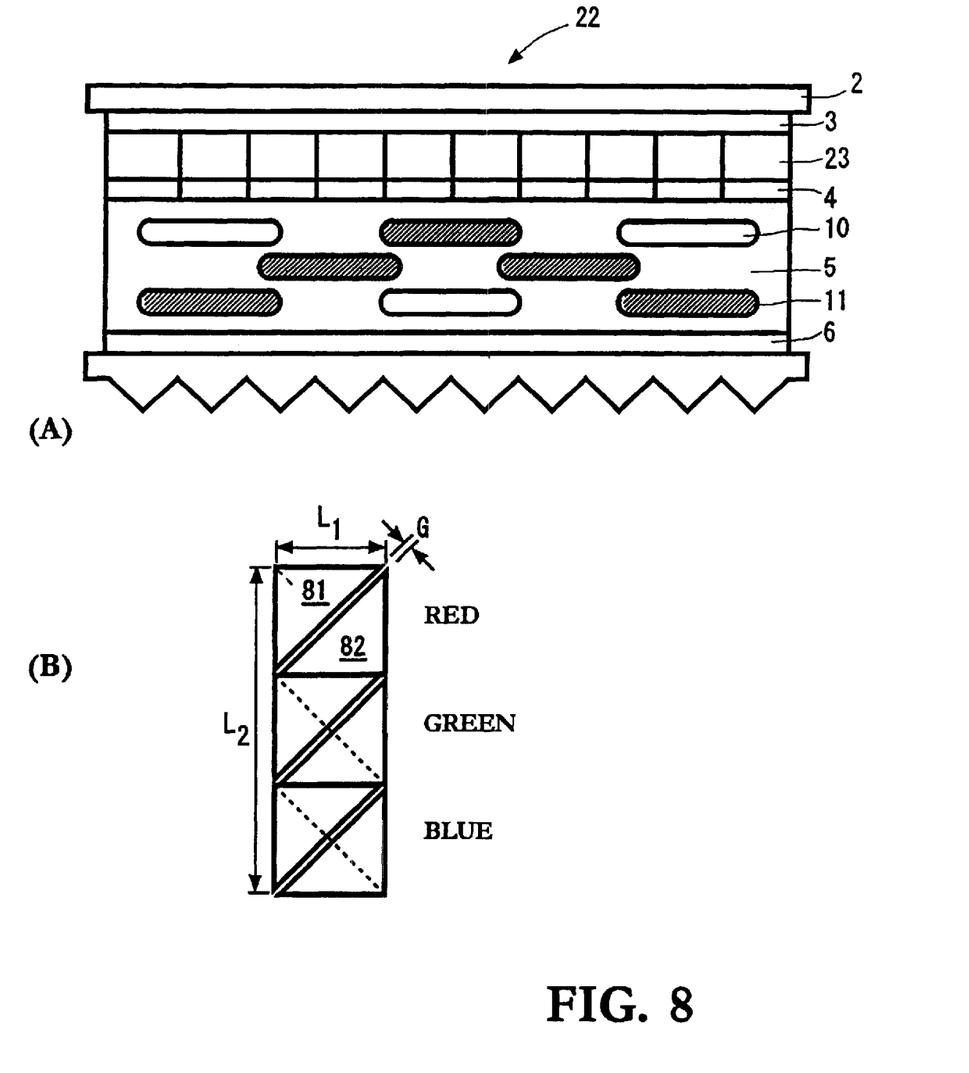
FIGS. 8A and 8B show a reflective guest-host color LCD device in accordance with the present invention.

FIG. 8A shows a reflective guest-host color LCD device 22 in which a color filter layer 23, including red filters, green filters and blue filters, is disposed between the light scattering layer 3 and the ITO 4 of the black-and-white-type guest-host type LCD device. FIG. 8B shows a plan view of reflector units for the one color cell including the three PELs. Each of the PELs includes the two reflector units 81 and 82. One color cell has a horizontal length $L_1$ and a vertical length $L_2$. An exemplary value of the lengths $L_1$ is substantially 100 $\mu$m and an exemplary value of the lengths $L_2$ is substantially 300 $\mu$m.

Figure 9:
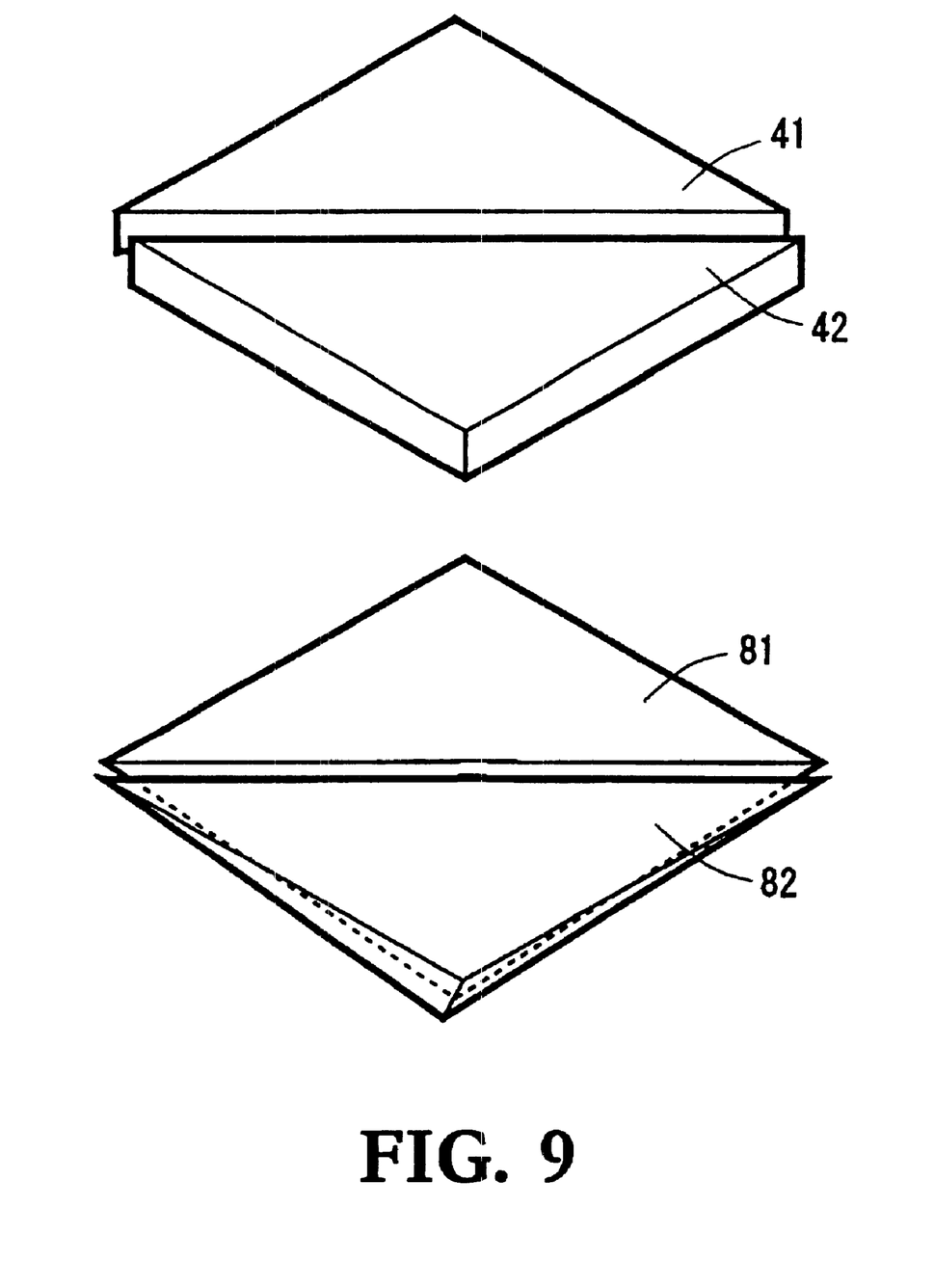
FIG. 9 shows two PELs each of which is defined by one triangle ITO and one trigonal pyramid shaped reflector unit.

FIG. 9 shows an alternative embodiment of the structure shown in FIGS. 5A and 5B. One ITO 4 shown in FIGS. 5A and 5B is divided into two triangle ITOs 41 and 42, as shown in FIG. 9. Each of the ITOs 41 and 42 defines one PEL, so that the size of the one PEL shown in FIG. 9 is about half of the PEL size shown in FIGS. 5A–5B. One PEL is defined by the ITO 41 and the trigonal pyramid reflector unit 81, and the other one PEL is defined by the ITO 42 and the trigonal pyramid reflector unit 82.

With the unique and unobvious features of the present invention, a reflective guest-host LCD device can be produced having low cost and a simple structure and which realizes both a high contrast ratio and high reflectivity.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. A reflective liquid crystal display device comprising:
   a first transparent substrate;
   a first electrode disposed on one surface of said first transparent substrate;
   a second transparent substrate having a first surface and a second surface; and a second electrode disposed on said first surface of said second transparent substrate, wherein said first transparent substrate and said second transparent substrate are arranged such that said first electrode and said second electrode face each other, and a space is provided between said first electrode and said second electrode, a guest-host liquid crystal layer is disposed in said space, said first electrode and said second electrode define a plurality of picture element positions, and a reflector unit having a shape of a trigonal pyramid is disposed at each of said plurality of picture element positions on said second surface of said second transparent substrate, wherein said reflector unit comprises a bottom plane having a shape of a right angled isosceles triangle.

2. A reflective liquid crystal display device comprising:

a first transparent substrate;

a first electrode disposed on one surface of said first transparent substrate;

a second transparent substrate having a first surface and a second surface; and a second electrode disposed on said first surface of said second transparent substrate, wherein said first transparent substrate and said second transparent substrate are arranged such that said first electrode and said second electrode face each other, and a space is provided between said first electrode and said second electrode, a guest-host liquid crystal layer is disposed in said space, said first electrode and said second electrode define a plurality of picture element positions, and a reflector unit having a shape of a trigonal pyramid is disposed at each of said plurality of picture element positions on said second surface of said second transparent substrate, wherein said trigonal pyramid includes a bottom plane of a shape of a right angled isosceles triangle having two shorter edges and one longer edge, a first reflecting plane extending from one of said shorter edges, a second reflecting plane extending from the other of said shorter edges, and a third reflecting plane extending from said longer edge, and wherein an angle between said bottom plane and said first reflecting plane is approximately 45 degrees, an angle between said bottom plane and said second reflecting plane is approximately 45 degrees, and an angle between said bottom plane and said third reflecting plane is approxiamately 87 degrees to approximately 90 degrees.

3. The reflective liquid crystal display device according to claim 2, wherein said second transparent substrate and said plurality of reflector units are integrally formed by a transparent material having a refractive index equal to or larger than approximately 1.3.

4. The reflective liquid crystal display device according to claim 3, wherein one of said shorter edges of the right-angled isosceles triangle is aligned to a rubbing direction for said guest-host liquid crystal layer.

5. The reflective liquid crystal display device according to claim 4, wherein a light scattering layer is disposed between said one surface of said first transparent substrate and said first electrode.

6. The reflective liquid crystal display device according to claim 5, wherein a color filter layer is disposed between said light scattering layer and said first electrode.

7. A reflective liquid crystal display device, comprising:

a first transparent substrate;

a first electrode disposed on one surface of said first transparent substrate;

a second transparent substrate having a first surface and a second surface; and a second electrode disposed on said first surface of said second transparent substrate, wherein said first transparent substrate and said second transparent substrate are arranged such that said first electrode and said second electrode face each other and a space is provided between said first electrode and said second electrode, a guest-host liquid crystal layer is disposed in said space, said first electrode and said second electrode define a plurality of picture element positions, and two reflector units, each of which has a shape of a trigonal pyramid, are disposed at each of said plurality of picture element positions on said second surface of said second transparent substrate.

8. The reflective liquid crystal display device according to claim 7, wherein said trigonal pyramid includes a bottom plane of a shape of a right-angled isosceles triangle having two shorter edges and one longer edge, a first reflecting plane extending from one of said shorter edges, a second reflecting plane extending from the other of said shorter edges, and a third reflecting plane extending from said longer edge, wherein an angle between said bottom plane and said first reflecting plane is approximately 45 degrees, an angle between said bottom plane and said second reflecting plane is approximately 45 degrees, an angle between said bottom plane and said third reflecting plane is approximately 87 degrees to approximately 90 degrees, and wherein said two reflector units at each of said plurality of picture element positions are disposed so that said third reflecting plane of one of said two reflector units is adjacent to said third reflecting plane of the other of said two reflector units.

9. The reflective liquid crystal display device according to claim 8, wherein a top point of said one reflector unit and a top point of the other reflector unit are separated by an air gap in a range of approximately 2 $\mu$m to approximately 10 $\mu$m.

10. The reflective liquid crystal display device according to claim 8, wherein a top point of said one reflector unit and a top point of the other reflector unit are separated by an air gap in a range of approximately 5 $\mu$m to approximately 8 $\mu$m.

11. The reflective liquid crystal display device according to claim 9, wherein said second transparent substrate and said plurality of reflector units are integrally formed by a transparent material having a refractive index equal to or larger than approximately 1.3.

12. The reflective liquid crystal display device according to claim 11, wherein one of said shorter edges of the right-angled isosceles triangle is aligned to a rubbing direction for said guest-host liquid crystal layer.

13. The reflective liquid crystal display device according to claim 12, wherein a light scattering layer is disposed between said one surface of said first transparent substrate and said first electrode.

14. The reflective liquid crystal display device according to claim 13, wherein a color filter layer is disposed between said light scattering layer and said first electrode.

15. A reflector unit array for a reflective guest-host liquid crystal display device, comprising:

two reflector units disposed at each of a plurality of picture element positions of said reflective liquid crystal display device for reflecting an incident light into said reflective liquid crystal display device, wherein each of said reflector units has a shape of a trigonal pyramid.

16. The reflector unit array according to claim 15, wherein said trigonal pyramid includes a bottom plane of a shape of a right-angled isosceles triangle having two shorter edges and one longer edge, a first reflecting plane extending from one of said shorter edges, a second reflecting plane extending from the other of said shorter edges, and a third reflecting plane extending from said longer edge, and wherein an angle between said bottom plane and said first reflecting plane is approximately 45 degrees, an angle between said bottom plane and said second reflecting plane is approximately 45 degrees, an angle between said bottom plane and said third reflecting plane is approximately 87 degrees to approximately 90 degrees.

17. The reflector unit array according to claim 16, wherein said two reflector units at each of said plurality of picture element positions are disposed such that said third reflecting plane of one of said two reflector units is adjacent to said third reflecting plane of the other of said two reflector units.

18. The reflector unit array according to claim 17, wherein a top point of said one reflector unit and a top point of the other reflector unit are separated by an air gap in a range of approximately 2 µm to approximately 10 µm.

19. The reflector array according to claim 17, wherein a top point of said one reflector unit and a top point of the other reflector unit are separated by an air gap in a range of approximately 5 µm to approximately 8 µm.

20. The reflector array according to claim 18, wherein said plurality of reflector units are integrally formed by a transparent material having a refractive index equal to or larger than approximately 1.3.

21. The reflective liquid crystal display device according to claim 1, wherein said a bottom plane comprises two shorter edges and one longer edge, a first reflecting plane extending from one of said shorter edges, a second reflecting plane extending from the other of said shorter edges, and a third reflecting plane extending from said longer edge.

22. The reflective liquid crystal display device according to claim 21, wherein an angle between said bottom plane and said first reflecting plane is approximately 45 degrees, an angle between said bottom plane and said second reflecting plane is approximately 45 degrees, and an angle between said bottom plane and said third reflecting plane is about 87 degrees to approximately 90 degrees.

23. The reflective liquid crystal display device according to claim 21, wherein said reflector unit comprises two reflector unit portions disposed at each pixel element position.

24. The reflective liquid crystal display device according to claim 23, wherein a top point of each of said two reflector unit portions are separated by distance in a range of about 2 µm to about 10 µm.

25. The reflective liquid display device according to claim 1, wherein said second electrode has a length substantially equal to a length of said first electrode.

* * * * *